United States Patent [19]

Ozaki et al.

[11] Patent Number: 4,774,701
[45] Date of Patent: Sep. 27, 1988

[54] DATA RECORDING METHOD WITH IMPROVED SYNCHRONIZATION RECOVERY

[75] Inventors: Minoru Ozaki; Fumio Matsuda; Hiroyuki Kumazawa, all of Amagasaki; Tooru Inoue, Kamakura, all of Japan

[73] Assignee: Mitsubishi Denki Kabushiki Kaisha, Tokyo, Japan

[21] Appl. No.: 906,403

[22] Filed: Sep. 9, 1986

[30] Foreign Application Priority Data

Sep. 10, 1985 [JP] Japan ................... 60-201199

[51] Int. Cl.$^4$ ............................ G11B 20/12
[52] U.S. Cl. ........................ 369/59; 360/48
[58] Field of Search ............ 360/48, 40, 52, 51; 369/59, 47, 48, 49, 50

[56] References Cited

U.S. PATENT DOCUMENTS

| 3,765,005 | 10/1973 | Cannon .................... 360/48 |
| 4,315,283 | 2/1982 | Kinjo et al. |
| 4,375,100 | 2/1983 | Tsuji et al. |

FOREIGN PATENT DOCUMENTS

| 2715573 | 10/1977 | Fed. Rep. of Germany . |
| 2944191 | 5/1980 | Fed. Rep. of Germany . |
| 65320 | 6/1981 | Japan . |
| 185035 | 10/1984 | Japan . |
| DS2052200 | 4/1981 | Netherlands ............ 369/59 |
| 2012460A | 7/1979 | United Kingdom . |
| 2061575A | 5/1981 | United Kingdom . |

OTHER PUBLICATIONS

"Mass Storage Optical Disk File Apparatus Capable of Recording Code Information", Yoshito Sumida et al., Nikkei Electronics (Japanese Periodical), Nov. 21, 1983, pp. 189–213.

Primary Examiner—Raymond F. Cardillo
Assistant Examiner—Kevin J. Fournier
Attorney, Agent, or Firm—Lowe, Price, LeBlanc, Becker & Shur

[57] ABSTRACT

A recording format on a recording medium comprises a data portion (4) in which a data train should be recorded. The data portion (4) comprises a user data portion (44 and 47), a check data portion (45) and resynchronizing pattern portions (46). The data train is divided into m or 4 code words, each code word being n=148 bytes. The resynchronizing pattern portions (46) are added to the data train for every m×3=12 bytes of data to be recorded, and serves to recover data synchronization in the event that data synchronization is missed. Each code word having a check data portion (45) is capable of correcting errors of T bytes, and errors generated in each code word by missing of data synchronization can be corrected.

2 Claims, 2 Drawing Sheets

DATA RECORDING METHOD WITH IMPROVED SYNCHRONIZATION RECOVERY

BACKGROUND OF THE INVENTION

1. Field of the Invention

The present invention relates to a data recording method, and particularly to a method for recording intermittently data trains each having a fixed word length on a recording medium.

2. Description of the Prior Art

FIG. 1 is a diagram showing a data recording format employed in a data recording apparatus, such as an optical disk apparatus, according to a conventional data recording method. The recording format as shown in FIG. 1 is disclosed in, for example, "Mass Storage Optical Disk File Apparatus Capable of Recording Code Information" by Yoshito Sumida et al., NIKKEI ELECTRONICS (Japanese Periodical), Nov. 21, 1983, pp. 189–213.

Referring to FIG. 1, a recording format employed in an optical disk apparatus comprises a header portion 1 which is recorded on an optical disk (not shown) in advance to indicate the position clearly in which one of the data trains should be recorded for intermittent recording of the data trains, a preamble portion 2 for performing bit synchronization, a synchronizing pattern portion 3 for indicating the head position of one of the data trains to be recorded clearly, a data portion 4 in which one of the data trains should be recorded and a gap portion 5 for separating this recorded data train from the next data train to be recorded.

FIG. 2 is a diagram illustrating the data portion 4 in the recording format shown in FIG. 1 in detail. The detailed description as to FIG. 2 is also provided in the above specified Japanese periodical, pp. 205. Referring to FIG. 2, the data portion 4 generally comprises a user data portion 41, a check data portion 42 for error check and correction, and a resynchronizing pattern portion 43 for recovering data synchronization. More particularly, the user data portion 41 is capable of storing the data of 528 bytes ($D_1$ to $D_{528}$), which data portion is divided into 16 pieces. Each of these pieces includes 33 bytes of user data. In addition, the check data portion 42 includes check data of 64 bytes ($C_1$ to $C_{64}$), and such check data portion is also divided into 16 pieces, each piece including 4 bytes of check data. These pieces of check data are added to the above described pieces of user data correspondingly, so that user data $D_1$ to $D_{33}$ is combined with check data $C_1$ to $C_4$ to form a first code word, user data $D_{34}$ to $D_{66}$ is combined with check data $C_5$ to $C_8$ to form a second code word, . . . , and user data $D_{496}$ to $D_{528}$ is combined with check data $C_{61}$ to $C_{64}$ to form a 16th code word. The resynchronizing pattern portion 43 includes the data of 36 bytes ($R_1$ to $R_{36}$).

In the recording format as shown in FIG. 2, one of the data trains is recorded in the data portion 4 in such a manner that the first byte in the first code word ($D_1$), the first byte in the second code word ($D_{34}$), . . . , the first byte in the 16th code word ($D_{496}$), and the resynchronizing pattern portion ($R_1$) are recorded in sequence in the first recording cycle, and then the second byte in the first code word ($D_2$), the second byte in the second code word ($D_{35}$), . . . , the second byte in the 16th code word ($D_{497}$), and the resynchronizing pattern portion ($R_2$) are recorded in sequence in the second recording cycle, and then such a recording cycle of 17 bytes from the first code word to the resynchronizing pattern portion is repeated continuously until recording of the last check data $C_{64}$ is completed. Namely, even if data synchronization of the regenerated signal is missed, such data synchronization could be recovered within every resynchronizing pattern since the resynchronizing pattern data bytes $R_1$ to $R_{36}$ are added to the data train for every 16 bytes of data to be recorded in accordance with the above described recording sequence. Accordingly, burst-like errors hardly occur in every code word.

Table 1 describes correcting capability of various recording formats, each with "Reed Solomon Coding" being applied to. In this Table 1, "n" means the total number of bytes in a single code word, "k" means the number of bytes of user data in a single code word, "n−k" means the number of bytes of check data in a single code word, "T" means the number of correctable bytes in a single code word, "m" means the number of code words in the data train and "Ps" means error bytes probability. In this case, the total number of bytes of user data in the single data train equals to $k \times m = 528$ and the total number of bytes of check data in the single data train equals $(n−k) \times m = 64$, and these numbers are assumed to be constant. This Table 1 shows three kinds of recording formats A, B and C, depending on the length of "n".

TABLE 1

|  | A | B | C |
|---|---|---|---|
| NUMBER OF BYTES OF USER DATA IN A SINGLE CODE WORD (k) | 3 | 66 | 132 |
| NUMBER OF BYTES OF CHECK DATA IN A SINGLE CODE WORD (n-k) | 4 | 8 | 6 |
| NUMBER OF CORRECTABLE BYTES (T) | 2 | 4 | 8 |
| NUMBER OF CODE WORDS (m) | 6 | 8 | 4 |
| CODING EFFICIENCY (USER DATA/TOTAL DATA) | 0.89 | 0.89 | 0.89 |
| PROBABILITY OF UNCORRECTABLE BYTES (Ps: ERROR BYTES PROBABILITY) | $1.2 \times 10^5 Ps^3$ | $1.3 \times 10^8 Ps^5$ | $2.9 \times 10^{14} Ps^9$ |
| PROBABILITY OF UNCORRECTABLE BYTES (Ps = $10^{-4}$) | $1.2 \times 10^{-7}$ | $1.3 \times 10^{-12}$ | $2.9 \times 10^{-22}$ |

As seen from Table 1, among various recording formats each having a common coding efficiency of 0.89, probability of uncorrectable byte of the recording format in which the total number of bytes in a single code word "n" is large, such as the format C, is lower than that of the other formats, such as the formats A and B, and such recording format C whose "n" is large has high correcting capability.

However, if the total number of bytes of user data in the single data train is constant as described in the foregoing, the number of code words "m" becomes smaller when the total number of bytes in a single code word "n" becomes large, causing a problem that the ratio of the resynchronizing pattern portion in the data portion increases.

Although such error correcting function is disclosed in Japanese Patent Laying-Open Gazette Nos. 65320/1981 and 185035/1984, the above described problem could not be solved by the disclosures in these references.

SUMMARY OF THE INVENTION

Briefly stated, the present invention comprises a method for recording data trains on a recoding medium intermittently according to the predetermined recording format including a preamble portion for performing bit synchronization, a synchronizing pattern portion for indicating the head position of one of the data trains to be recorded and a data portion in which one of the data trains should be recorded, comprising the steps of dividing one of the data trains into m pieces of data, each piece including k bytes, adding check data portions to the m pieces of data correspondingly to form m code words, recording the data train in the data portion in such a manner that every first byte in m code words is recorded in sequence in the first recoding cycle starting with the first byte in the first code word, and then every second byte in m code words is recorded in sequence in the second recording cycle starting with the second byte in the first code word, and then such a recording cycle of m bytes is repeated continuously until recording of every mth byte in m code words is completed, and adding resynchronizing pattern portions to the data trains for every $m \times r$ ($r > 1$, r: an integer) bytes of data to be recorded in accordance with the recording sequence.

According to another aspect of the present invention, each of the code words including the check data portion, is capable of correcting errors of T bytes at the maximum and the integer r is not more than T.

Therefore, a primary object of the present invention is to provide a data recording method capable of keeping high ratio of a user data portion to a data portion in a recording format and having high error correcting capability.

A primary advantage of the present invention is that the number of bytes in a single code word can be increased while the number of the resynchronizing pattern portion can be reduced.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
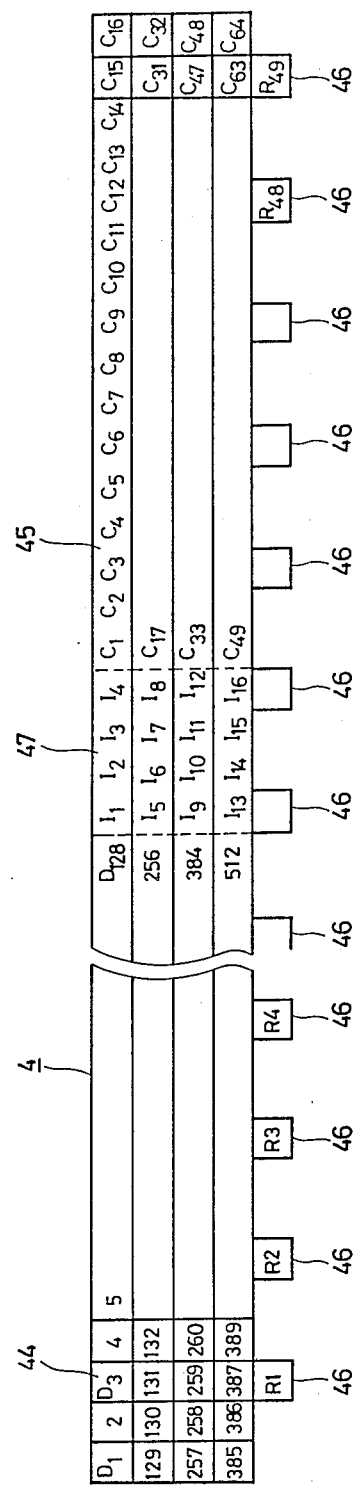
FIG. 3 is a diagram illustrating a data portion in a recording format according to one embodiment of the present invention.

FIG. 3 is a diagram illustrating a data portion in a recording format in detail according to a data recoding method of one embodiment of the present invention.

Referring to FIG. 3, a data portion 4 generally comprises a user data portion 44, a check data portion 45, resynchronizing pattern portions 46 and a control data portion 47 which should be regarded as a part of the user data portion 44. In the recording format shown in FIG. 3, the number of the code words "m" equals 4, each code word includes data of n=148 bytes, and the number of the resynchronizing pattern portions 46 is 49. In addition, the resynchronizing pattern portions 46 are added to the data train for every $m \times 3 = 12$ bytes of data to be recorded. For example, Table 2 describes correcting capability of the recording formats A and B. In this case, the total number of bytes of user data in the single data train equals $k \times m = 528$ and the total number of bytes of check data in the single data train equals $(n-k) \times m = 64$, and these numbers are assumed to be constant.

TABLE 2

Figure 1:
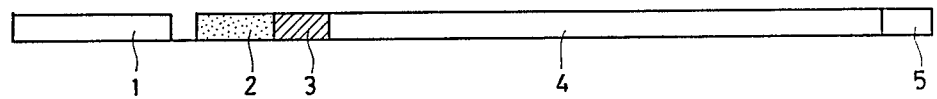
FIG. 1 is a diagram showing a conventional recording format for a data train employed in a optical disk apparatus.
Figure 2:
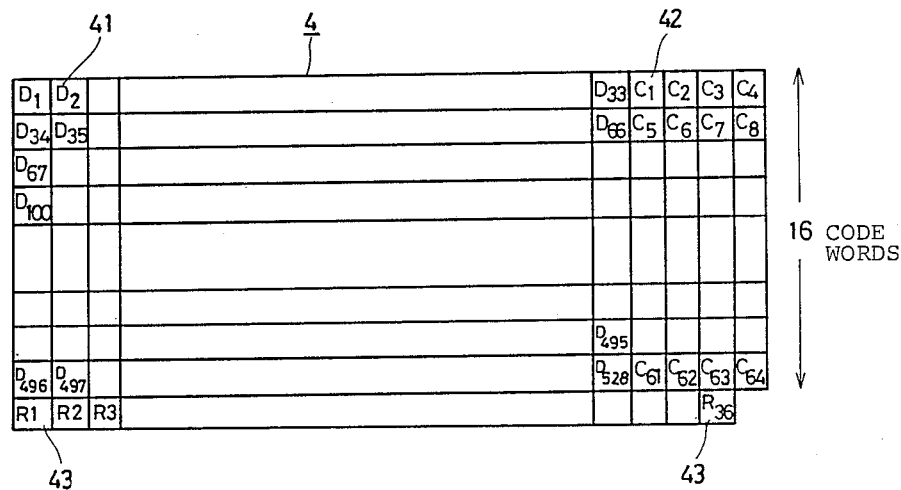
FIG. 2 is a diagram illustrating a data portion in the recording format shown in FIG. 1 in detail.

|  | C | A |
|---|---|---|
| NUMBER OF BYTES OF USER DATA IN A SINGLE CODE WORD (k) | 132 | 33 |
| NUMBER OF BYTES OF CHECK DATA IN A SINGLE CODE WORD (n-k) | 16 | 4 |
| NUMBER OF CODE WORD (m) | 4 | 16 |
| NUMBER OF RESYNCHRONIZING PATTERN PORTIONS | 49 | 36 |
| PROBABILITY OF UNCORRECTABLE BYTES (ERROR BYTE PROBABILITY Ps = $10^{-4}$) | $2.9 \times 10^{-22}$ | $1.2 \times 10^{-9}$ |
| CODING EFFICIENCY (USER DATA/TOTAL DATA) (INCLUDING RESYNCHRONIZING PATTERN) | 0.82 | 0.84 |
| NOTE | SHOWN IN FIG. 3 | SHOWN IN FIG. 2 |

According to the recording format (format C) shown in FIG. 3, errors might occur for $m \times 3 = 12$ bytes at the maximum in the event that data synchronization of the regenerated signal is missed because of drop-out or the like. However, such errors can be corrected since occurrence of errors for m×3 bytes means the situation where errors occur for 3 bytes in each word, and each code word has error correcting capability of 8 bytes as shown in Table 1. In addition, even if the resynchronizing pattern portion could not be detected immediately after missing of data synchronization, errors do not occur for more than $(m \times 3) \times 2 = 24$ bytes because of detection of the next resynchronizing pattern portion. Accordingly, such occurrence of errors for $(m \times 3) \times 2$ bytes means the situation where errors occur for 6 bytes in each code word, and such error can be corrected by error correcting capability of 8 bytes of the code word. As seen from the comparison in Table 2, probability of uncorrectable byte in the format C is higher than that in the format A.

Although description was given for the embodiment in which the resynchronizing pattern portions are added to the data train for every m×3 bytes of data to be recorded, the present invention can be applied to the recording format in which the resynchronizing pattern portions are added to the data train for every m×r bytes of data to be recorded, the integer r being smaller than the number of correctable bytes of the single code word "T".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for recording data trains on a recording medium intermittently according to the predetermined recording format, said recording format including a preamble portion (2) for performing bit synchronization, a synchronizing pattern portion (3) for indicating the head position of one of said data trains to be recorded and a data portion (4) in which one of said data trains should be recorded, said method comprising the steps of;
   dividing one of said data trains into m pieces of data, each piece including k bytes;
   adding check data portions (45) to said m pieces of data (m being an integer) correspondingly to form m code words;
   recording said data train in said data portion in such a manner that every first byte in m code words is recorded in sequence in first recording cycle starting with the first byte in the first code word, and then every second byte in m code is recorded in sequence in the second recording cycle starting with the second byte in the first code word, and then such a recording cycle of m bytes is repeated continuously until recording of every mth byte in m code words is completed and;
   adding resynchronizing pattern portions (46) to said data train for every m×r (r>1, r: an integer) bytes of data to be recorded in accordance with the recording sequence.

2. A method according to claim 1, wherein
   each of said code words, including said check data portion, is capable of correcting errors of T bytes at the maximum, and said r is not more than T.

* * * * *